(12) United States Patent
Bland

(10) Patent No.: US 8,438,921 B1
(45) Date of Patent: May 14, 2013

(54) GRADUATED MEASURING CONTAINER AND METHOD FOR MEASURING AND MIXING MATERIAL COMPOUNDS

(76) Inventor: Michael Scott Bland, Atlanta, GA (US)

( * ) Notice: Subject to any disclaimer, the term of this patent is extended or adjusted under 35 U.S.C. 154(b) by 285 days.

(21) Appl. No.: 12/931,571

(22) Filed: Feb. 4, 2011

Related U.S. Application Data

(60) Provisional application No. 61/337,654, filed on Feb. 4, 2010.

(51) Int. Cl.
*G01F 19/00* (2006.01)

(52) U.S. Cl.
USPC .................................. 73/427; 73/426; 73/429

(58) Field of Classification Search ..................... 73/427, 73/429; 206/219, 221
See application file for complete search history.

(56) References Cited

U.S. PATENT DOCUMENTS

| | | | | |
|---|---|---|---|---|
| 4,079,629 A | * | 3/1978 | Hope | 73/427 |
| 6,588,681 B2 | * | 7/2003 | Rothrum et al. | 239/328 |
| 7,472,595 B2 | * | 1/2009 | Ploix | 73/426 |
| 2007/0068250 A1 | * | 3/2007 | Krent | 73/427 |

* cited by examiner

*Primary Examiner* — Lisa Caputo
*Assistant Examiner* — Roger Hernandez-Prewitt
(74) *Attorney, Agent, or Firm* — Robert Z. Evora, Esq.

(57) ABSTRACT

A measurement container with any number of graduated scales based upon total volume of application or based upon standardized consumer sized product vessels, with the adaptability to measure large or small amounts. The container will have a pour spout to ease introductions into batches. The measurement container will also include a handle and hand grab, to ease lifting and pouring with both hands.

15 Claims, 14 Drawing Sheets

GRADUATED MEASURING CONTAINER AND METHOD FOR MEASURING AND MIXING MATERIAL COMPOUNDS

CROSS REFERENCE TO RELATED APPLICATION

This application is a Non-Provisional Application which claims the benefit of the filing date of U.S. Provisional Application Ser. No. 61/337,654, entitled "Graduated Measuring Container And Method For Measuring And Mixing Material Compounds" filed Feb. 4, 2010, the entirety of which is incorporated herein by reference.

TECHNICAL FIELD

The subject disclosure relates to a measuring container and method for measuring various materials, and in particular to a graduated measuring container adapted to allow a novice user to be able to expertly mix a variety of consumer construction and household compound materials in a consistent, self formulating and predictable manner based on pre-packaged batched materials.

BACKGROUND

In, and around the home, a construction site, and/or various other locations, various mixtures are combined to generate a preferred compound mixture. A number of different household items require the measure of a first compound (either a liquid or solid) to be added to at least a second compound (another solid or liquid) thereby creating a preferred compound mixture. Currently, home, as well as construction type measuring devices is universally scaled in standard volumetric units (such as ounces, cups, liters, gallons, etc) for use with any material compound that is to be measured. Present measuring devices are not adapted to measure commercially available batched manufactured proportions since these quantities are generally too large for current measuring containers thereby creating excessive amount of waste product.

For example, where a novice builder would like to build a deck made of concrete, the novice builder would have to attempt to "guestimate" how many bags of concrete would be necessary, as well as the other requisite mixing components necessary in making the concrete deck. Since concrete is sold in batched quantities of a predetermined amount, this predetermined amount becomes another complicated variable to the novice builder as he attempts to calculate the amount of the various components he would need to complete the deck. Unfortunately, what happens, more often than not, is that the quantity of the various required components for the finished compound concrete mixture is very difficult to determine. Invariably, the amount secured by the novice builder is often too complicated to determine and of an unknown quantity. Consequently, the finished quantity purchased by the novice builder may be too small a quantity thereby creating the cumbersome task of having to re-mix additional compound. On the other hand, the inadequate estimate by the novice builder yields a resultant quantity that is too large thereby creating excessive and unnecessary waste.

Every household typically has more than one measuring device for instances where at least two compounds have to be mixed to generate a particular product. The problem is that as the number of compounds is mixed, so too is the inaccuracy with which the various products are measured and mixed. That is, one compound may be measured by a first graduated scale of a first measuring device to measure the first volume of either a liquid or solid, and combined with another measured or non-measured volume for a second compound from a second graduated scale of a second measuring device. The various measuring devices increases the inaccuracy of the various compounds mixed together. The iterative process of measuring the various components many times over increases the inaccuracy of the inconsistent mixture, which may inevitably result in the compound becoming too thin or too thick. Unfortunately, the intended mixture and consistency throughout the combined product is replete with inconsistencies and materially affects the function and integrity of the desired product.

Likewise, another problem with most household measuring devices is the size of the measuring device. Since the smaller measuring devices are adapted to measure smaller quantities with greater accuracy and larger devices are adapted to measure larger quantities. The precise accuracy of utilizing the larger measuring devices suffers when a user attempts to measure a smaller increment with the larger measuring device. And vice-versa, miscalculating the proper mixture as a consequence of utilizing a smaller measuring device for an intended large quantity, results in the user having to repeatedly measure volumes numerous times with the small measuring device which ultimately affects the inaccurate final measured compound. Regrettably, a user will try and compensate by purchasing multiple unnecessary measuring tools which ultimately become lost and/or misplaced.

In an attempt to resolve some of these concerns, large measuring devices have been designed and proposed for use unsuccessfully. At least one disadvantage of many of these larger measuring devices is that they are heavy and not designed in such a way for ease of lifting and pouring. To carefully mix proper portions of the various mixing compounds, one must be able to lift large loads in the measuring device with one hand while controlling the dispensing action easily with the other hand for a controlled safe pour into the combined compound. The large gaping mouth of a top edge of the large measuring device typically does not come with a pour spout such that the measured product cannot easily flow out of the large container.

Furthermore, all outdoor consumer mixing materials, such as for example, but not limited to: mortar, concrete, thin set grout, joint compound, chlorine for swimming pools, grass seed and fertilizer, are sold in a variety of different standard size bags and containers. Conveniently, these containers or bags are set to a specific industry standard batch quantity size for each specific material. Consequently, as a first raw material is mixed with a second compound (such as water, or grass seed and fertilizer—which is broadcast onto a yard in an easily reproducible consistent manner), there is no reliable, easy, way to recreate the same proportion of compound mixture consistently every time, or broadcast the correct amount of seed or fertilizer based on the yard size, and not necessarily the prepackaged batched size. Undesirably, an incorrect mixture (such as one less than the recommended mixture in the prepackaged batched bag) of the compound can waste raw material or create a hazard due to the instability of the final mixed product. As a result, over or under seeding or fertilizing a yard can kill a lawn and/or yield an undesired affect.

Many individual consumers who purchase a bag or two of a consumer prepackaged raw material have little experience with the products they purchase and how to appropriately mix and administer them over a predetermined area or volume. That is, the consumer is frequently unsure of the correct consistency of the finished product, or how much end product they are going to have once the product is mixed for a predetermined area or volume may not be equal to the predetermined mixture in the batched bag. Consequently, the end product is often incorrectly mixed, and often times mixed to an undesirable incorrect quantity.

Another disadvantage prone to the ill-mixing of raw consumer materials is a result of the standardization of industry container sizes based on various materials. There does not exist a single universal measuring device adapted to measure liquids and/or solids to create a perfect mix of each of the materials in a single universal measuring device.

Despite past and present innovation in measuring buckets, it is clear that this problem has not been solved and there is still a longstanding need for a graduated measuring container adapted to assist a novice user to be able to expertly mix a variety of consumer construction and/or household compound materials in a consistent, self formulating and predictable manner based on various manufactured pre-packaged batched materials.

SUMMARY

The subject disclosure addresses the shortcomings identified in providing a graduated measuring container adapted to assist a novice user to be able to expertly mix a variety of consumer construction and/or household compound materials in a consistent, self formulating and predictable manner based on various manufactured pre-packaged batched materials.

According to an aspect of this disclosure, a measuring container and method for determine an appropriate proportion of at least one composition for a complete mixture defined by a prepackaged batched material size product is disclosed. The method to determine an appropriate proportion of at least one component to be disposed within a measuring container for a complete mixture comprises providing a measuring container having various indicia defining a plurality of material mixture categories based on a commercially prepackaged batched container size of a raw material. Various graduated marks are provided on the measuring container identifying various predetermined level measurements for the at least one component to be combined with a predetermined amount of the commercially prepackaged batched container size of the raw material. The at least one component is filled into the measuring container up to the at least one predetermined level measurement based on the commercially prepackaged batched container size of the raw material selected from at least one the plurality of material mixture categories.

The method also further comprising providing a measuring container having various indicia defining a plurality of material mixture categories based on a commercially prepackaged batched container size of a raw material. The graduated marks are provided on the measuring container identifying various predetermined level measurements associated with the at least one component to be combined with a predetermined amount of the commercially prepackaged batched container size of the raw material based on an end use measurement comprised of at least one of: an overall area to be conveyed or a volume.

Yet another aspect of this subject disclosure is to provide a method to determine an appropriate proportional measurement of a commercially prepackaged batched container size of a raw material to be extracted from the commercially prepackaged batched container based on an overall complete area or a complete volume to treated by the raw material. The method comprises providing a measuring container having various indicia defining a plurality of raw material categories based on a commercially prepackaged batched container size of the raw material and the overall complete area or a complete volume to be treated by the raw material. The graduated marks on the measuring container identify various predetermined level measurements the raw material is to be filled based on the overall complete area or a complete volume to be treated by the raw material. The raw material is then filled into the measuring container up to the at least one predetermined level measurement based on the overall complete area or a complete volume to be treated by the raw material.

The measuring container is provided to determine an appropriate proportion of at least one composition for a complete mixture defined by a prepackaged batched material size product. The measuring container includes a cylindrical vertical wall defining a container cavity with an upwardly open upper end and an enclosed bottom end. A pour spout is disposed at the upwardly open upper end of the measuring container for pouring the at least one component of the at least one material mixture from the measuring container. A handle is provided to lift the measuring container. A recessed handle portion is located on the enclosed bottom end, opposite a location of the pour spout, in order to controllably pour the at least one component of the at least one material mixture from the pour spout of the measuring container.

Various indicia is provided that includes at least one material mixture category and associated graduated marks for measuring a level relating to a raw material being at least one component of the at least one material mixture and based on a batched container size of the raw material.

The measuring container further comprises at least one internal divider disposed inside of the measuring container and on the enclosed bottom end of the measuring container. The internal divider is disposed inside of the measuring container and on the enclosed bottom end of the measuring container. The internal dividers extend radially outward from a center of the enclosed bottom end of the measuring container to an outside cylindrical vertical wall of the measuring container. Each of the internal dividers is spaced radially at predetermined angular orientations relative to each other to define various volumetric sections. The internal dividers have wall heights of different sizes that further define the various volumetric sections.

The measuring container may be employed as a universal measuring container adapted for use with and to facilitate the formulation of various types of outdoor building and maintenance materials. End batch consistency and resultant batch volume for various mixtures can be simply determined via the various graduation marks on the measuring container which are provided to measure the amount of mixture based on the size of the consumer product being measured.

According to yet another aspect of this subject disclosure is the formulation of raw consumer mixing materials in industry standard batched bags may now be mixed to an identical consistency each time the product is mixed due to the ability to measure correct parts of ingredients each time.

The measuring container provides numerous advantages, such as to allow inexperienced individuals the ability, on a first attempt, to formulate mixtures efficiently, precisely and quickly. Overall, the measuring container is efficient and saves substantial time and expense due to the previous inability for a novice user to correctly and efficiently mixed various batches.

These and other objects, features, and/or advantages may accrue from various aspects of embodiments of the subject disclosure, as described in more detail below.

BRIEF DESCRIPTION OF THE DRAWINGS

Various exemplary embodiments of this subject disclosure will be described in detail, wherein like reference numerals refer to identical or similar components or steps, with reference to the following figures, wherein.

DETAILED DESCRIPTION

Figure 1:
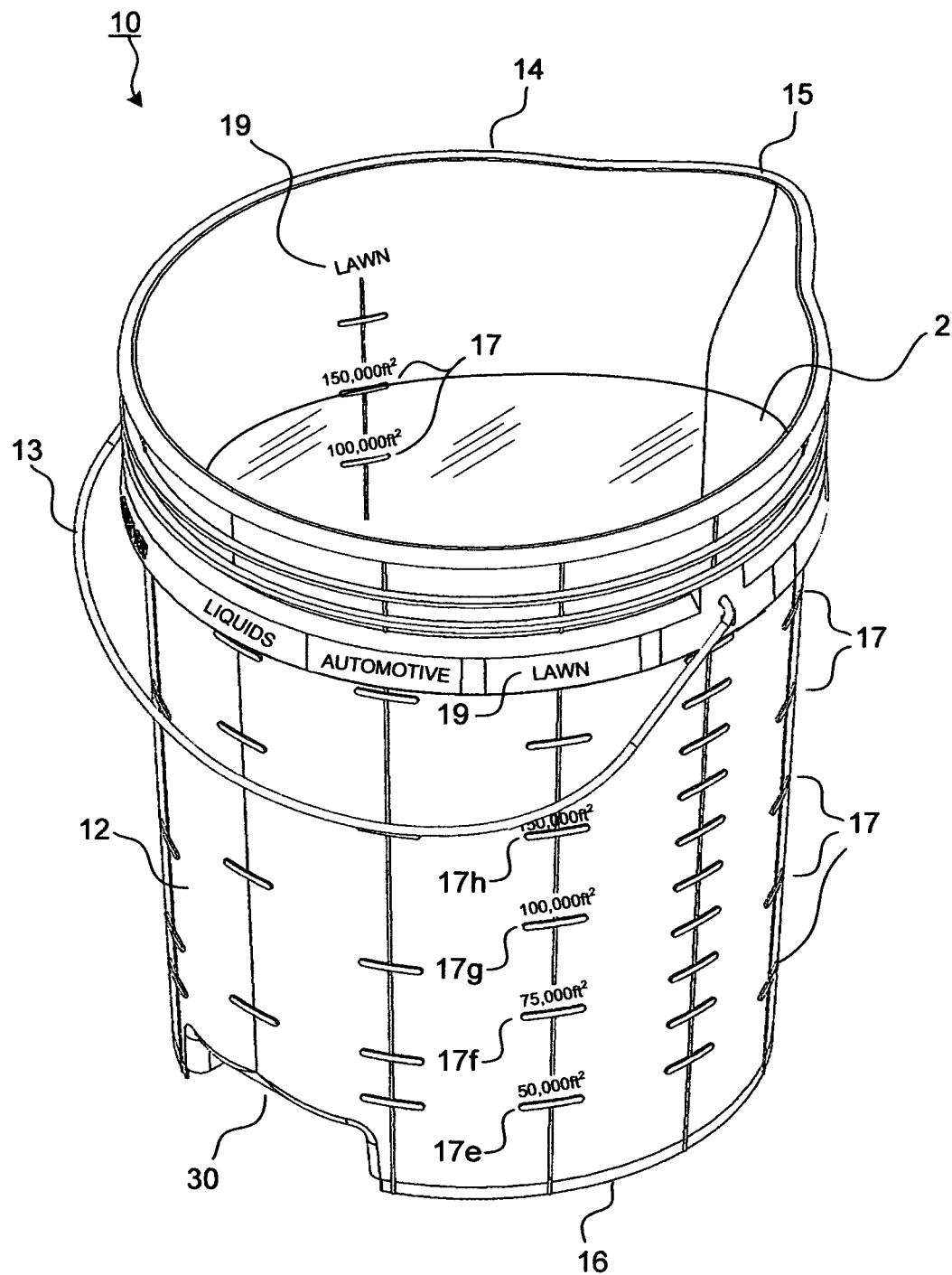
FIG. 1 illustrates a perspective view of an exemplary illustration of a measuring container in accordance with this subject disclosure.

Particular embodiments of this subject disclosure will now be described in greater detail with reference to the figures.

The present subject disclosure remedies the problem of consistently mixing industry standard sized bags or containers with the proper amount of solution for an end known batch result. That is, a graduated measuring container is provided that allows an unskilled user to be able to mix a variety of different consumer construction and/or household compound materials in a consistent manner. The measuring container is adapted to allow the user to easily self formulate and in a predictable manner appropriate measurements for various components in a mixture for various manufactured pre-packaged batched material items.

The use of the term "measuring container" is intended to be broadly interpreted to cover various sizes and shapes of volumetric containers. The term "batch," and variants thereof, such as "batched," "batch item," batched item" is intended to be interpreted as a predetermined quantity of a material prepared as a prepackaged unit required for use in a single mixing operation as defined by a manufacturer of the pre-packaged material for a predefined area or volume. The pre-defined container size of the packaged material is the batch size. By way of example, various consumer prepackaged batched units may include, but are not limited to the following materials: mortar, concrete, thin set grout, joint compound, chlorine for swimming pools, grass seed and fertilizer, and the like.

For example, concrete is typically sold in fifty, sixty or eighty pound prepackaged batched unit bags. The quantity defined in the various batched units are set in accordance with a specific industry standard batch quantity size for each of the specific materials. The batched quantity size does not consider, and is not dictated by the specific needs of the end consumer. Unlike with conventional measuring devices, and as will be described later in more detail with respect to graduation marks 17 (as shown in the figures), the batched quantity size relates to the graduation marks 17. That is, the measure identified by the graduation marks is a "batched" predetermined quantity of a particular material, such as a fifty pound bag of concrete, and not conventional volumetric measurements, such as ounces, cups, liters, gallons, etc.

The graduation marks 17 of the measuring container 10, may include a plurality of different types of indicators, such as but not limited to: traditional scales of measurement both domestic and international volumetric scales, non-traditional scales represented by raw product packaging volumes; end use scales of measurement (such as lawn square footage or swimming pool liquid volume), and the like.

One aspect of this disclosure is to allow the user to be able to consistently, recreate the identical proportion of a particular compound mixture every time a new batch unit is used to make a particular compound mixture. Accordingly, proper proportions of various components of a mixture compound can be mixed batch after batch in a consistent reliable manner. The measuring container of this subject disclosure takes the guess work out of trying to determine how much of a first component needs to be mixed with a second component (e.g., grass seed or fertilizer to convey or broadcast on to a lawn; or how much chlorine to add to a swimming pool and/or how much less is required for a smaller Jacuzzi from say a left over batch of chlorine used for the pool where an exact batch is no longer available) since the graduation marks 17 of the measuring container relate to batch quantities. It is to be understood that the graduation marks 17 may be broadly adapted for other uses in addition to the size of a raw ingredient package.

The measuring container 10 according to this subject disclosure is designed to measure liquids and/or solids for a variety of different types of materials, based on the container size, or batched quantity, the material is packaged in. The measuring container 10 can be adapted to be used to formulate batches through the implementation of at least one of the graduated marks/scales.

Figure 2:
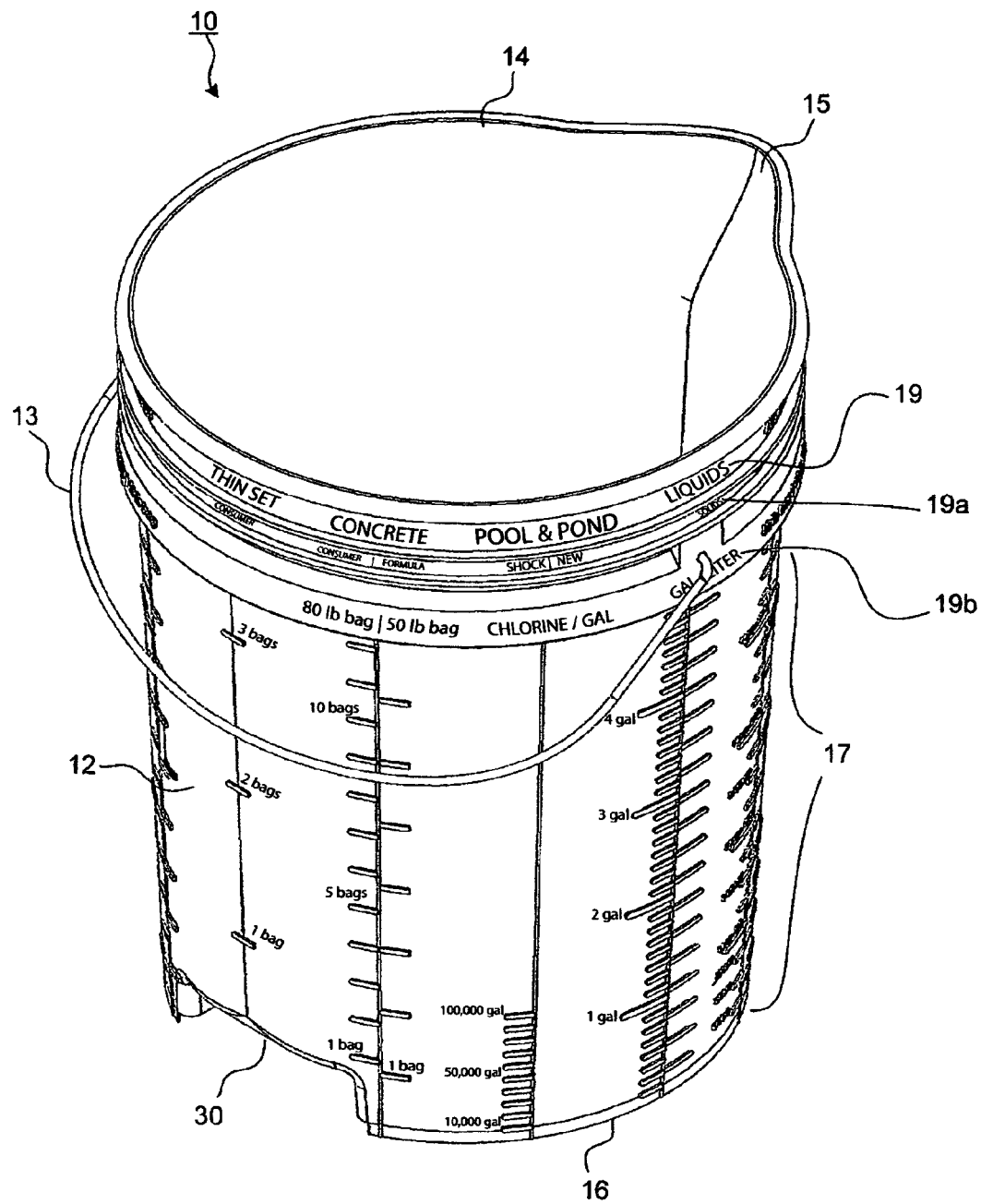
FIG. 2 illustrates a perspective view of another exemplary illustration of a measuring container in accordance with this subject disclosure.

FIGS. 1 and 2 illustrate a perspective view of an exemplary illustration of a measuring container 10 having a first material 2 disposed therein in accordance with this subject disclosure. As shown, the measuring container 10 is composed of a cylindrical vertical wall 12, a closed bottom end 16 and an upwardly directed open end 14. A spout 15 is disposed in the open top end 14, and an inverted handle 30 is disposed at the closed bottom end 16 of the measuring container 10. The spout 15 allows the user to dispense various material contents within the measuring container 10 in a controlled manner.

A handle 13 is attached to the measuring container 10 to allow the measuring container 10 to be easily picked up and carried. Those skilled in the art will understand that other shapes and sizes may be used for the measuring container 10 without departing from the scope of the subject disclosure.

Figure 3:
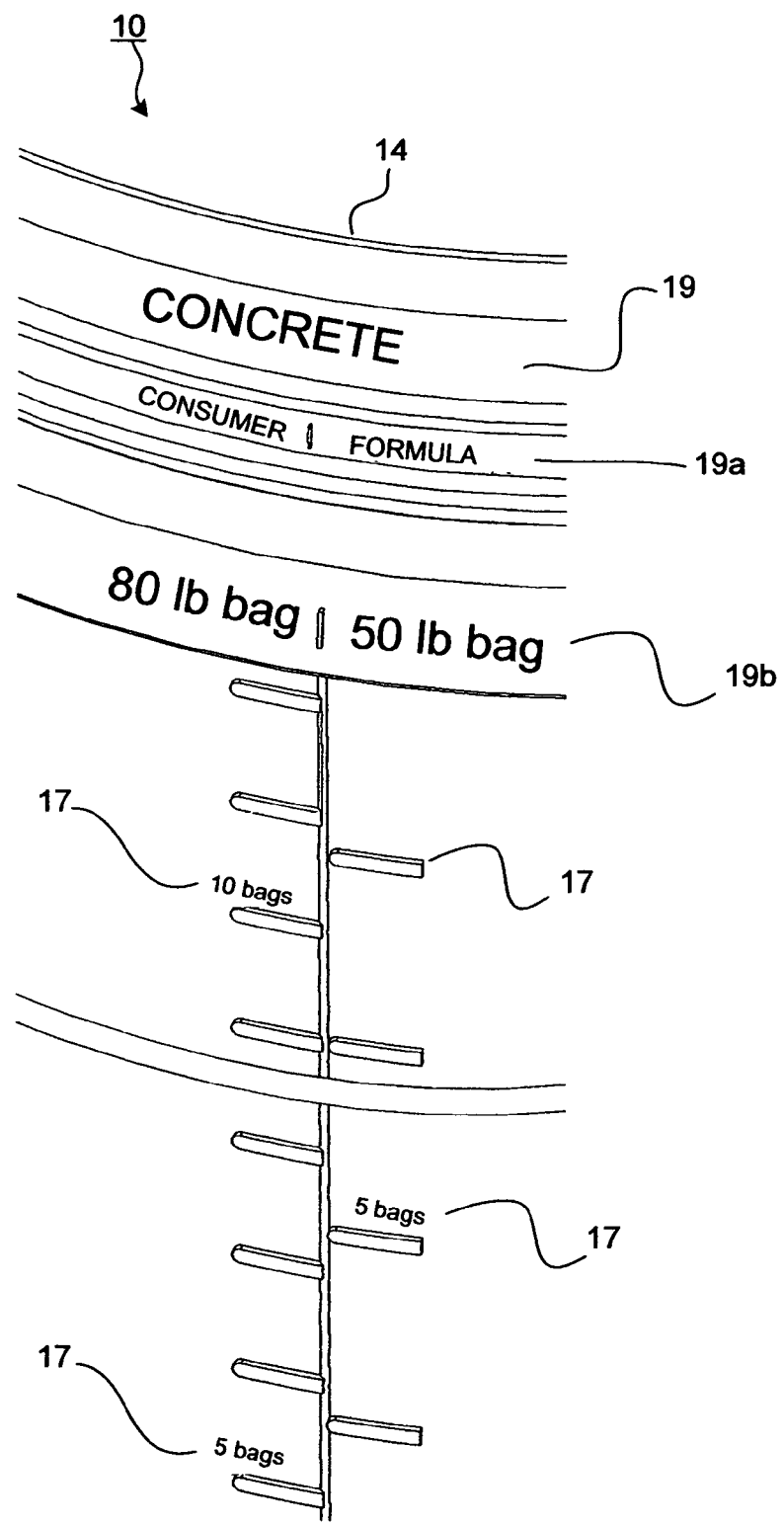
FIG. 3 is an exemplary exploded view of various exemplary indicia disposed on the measuring container in accordance with this subject disclosure.

FIG. 3 is an exploded view of a portion of the measuring container 10 showing the various indicia, for example in the form of category labels 19 (e.g., CONCRETE), subcategories 19a (e.g., CONSUMER/NO MIX FORMULA), batch and level 19b indicators (e.g., 80 lb bag/50 lb bag), and associated graduations marks 17 and indicators (e.g., 5 bags, 10 bags). It is to be understood that any type of indicia may be represented on the measuring container 10 in accordance with the subject disclosure. The various indicia may be disposed about both sides of the vertical walls 12 (as shown, inside and/or outside in FIG. 1) of the measuring container 10 to give an indication of the volume and/or other measurement of a specific batched item labeled by the category (subcategory or the like) label 19 and the required volume of the associated components to be mixed for that specific batched item defined by that particular category label 19.

Such as shown in FIG. 1, the item being measured into the measurement container may be an associated component (e.g., water) to be mixed or combined with a raw material (e.g., mortar) prepackaged in the specific batched item package, or the item being measured may be the raw material itself (e.g., a fertilizer, a pre-emergent, or seed, chlorine) from the commercially prepackaged batched item package, and may be based on a different overall complete area (e.g., area of a yard) or overall complete volume (e.g., volume of a swimming pool) to be treated by the particular raw material, as will be explained in more detail below.

Referring back to FIG. 1, an exemplary application for a LAWN as noted by category indicia designation 19 is illustrated. As shown, a raw material 2 is filled to the predetermined level designated by 150,000 ft$^2$. That is, the size of the lawn to be treated by the raw material has an area of 150,000 ft$^2$. Employing the use of the measurement container 10 makes determining an appropriate raw material or component to be mixed with the raw material simple and easy to use. In this manner, the user does not have to rely on the cumbersome directions on the label of the prepackaged batched item. Likewise, various other benefits are realized, such as for example, the user can use previous unused remaining portions of the complete prepackaged raw material item instead of having to use the entire mix when the job he is performing is to a small area or volume (e.g., in a Jacuzzi, instead of a large pool) does not require the entire prepackaged bag of raw material. The remainder may be saved for later use.

FIGS. 2 and 3 illustrate another exemplary embodiment for the measuring container 10. In this embodiment, various categories 19 are shown for use with the measuring container 10. Likewise, various subcategories 19a may be provided within each of the various categories 19. The various graduation marks 17 shown in FIG. 1A are specific to the various particular categories 19 and subcategories 19a illustrated in this exemplary embodiment. However, it is to be understood that a variety of different categories 19 and subcategories 19a, no shown here are possible—but for sake of brevity, each and every conceivable permeation is not shown but understood by one of ordinary skill in the art to be inclusive within the scope of this subject disclosure.

Figure 4:
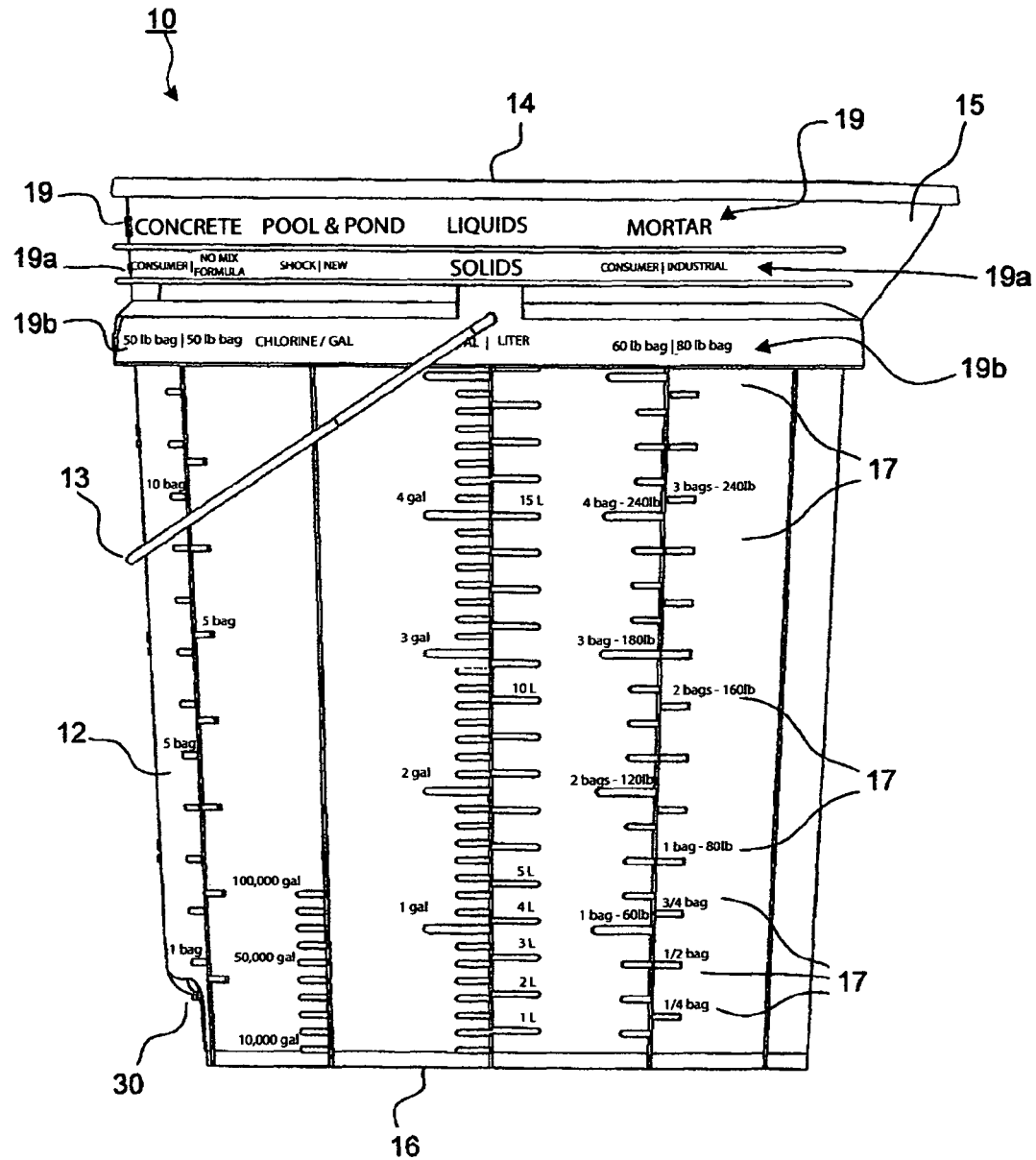
FIG. 4 is a left side view of the measuring container in accordance with this subject disclosure.
Figure 5:
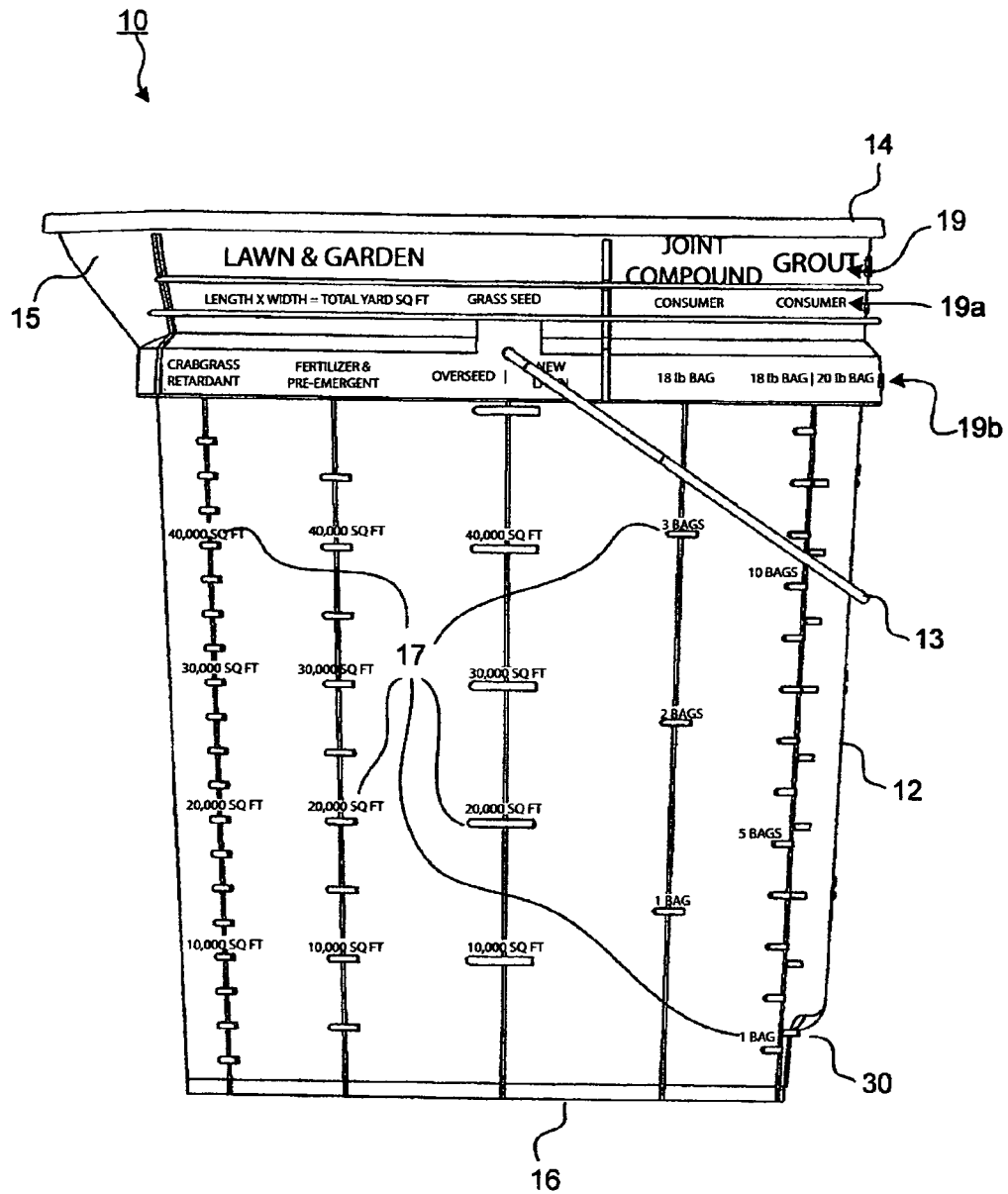
FIG. 5 is a right side view of the measuring container in accordance with this subject disclosure.

FIGS. 4 and 5 illustrate left and right side views of the measuring container 10. The spout 15, the various category labels 19, subcategories 19a, batch and level 19b indicators, and graduation marks 17 disposed on the vertical walls 12 of the measuring bucket 10 are better illustrated herein. In particular, the graduation marks 17 are specific, and correspond, to the various category labels 19 for measuring various types of mixtures, such as for: Automotive, Lawn, Liquids, Mortar, Thin Set, Conversion, Paint, and the like.

Figure 6:
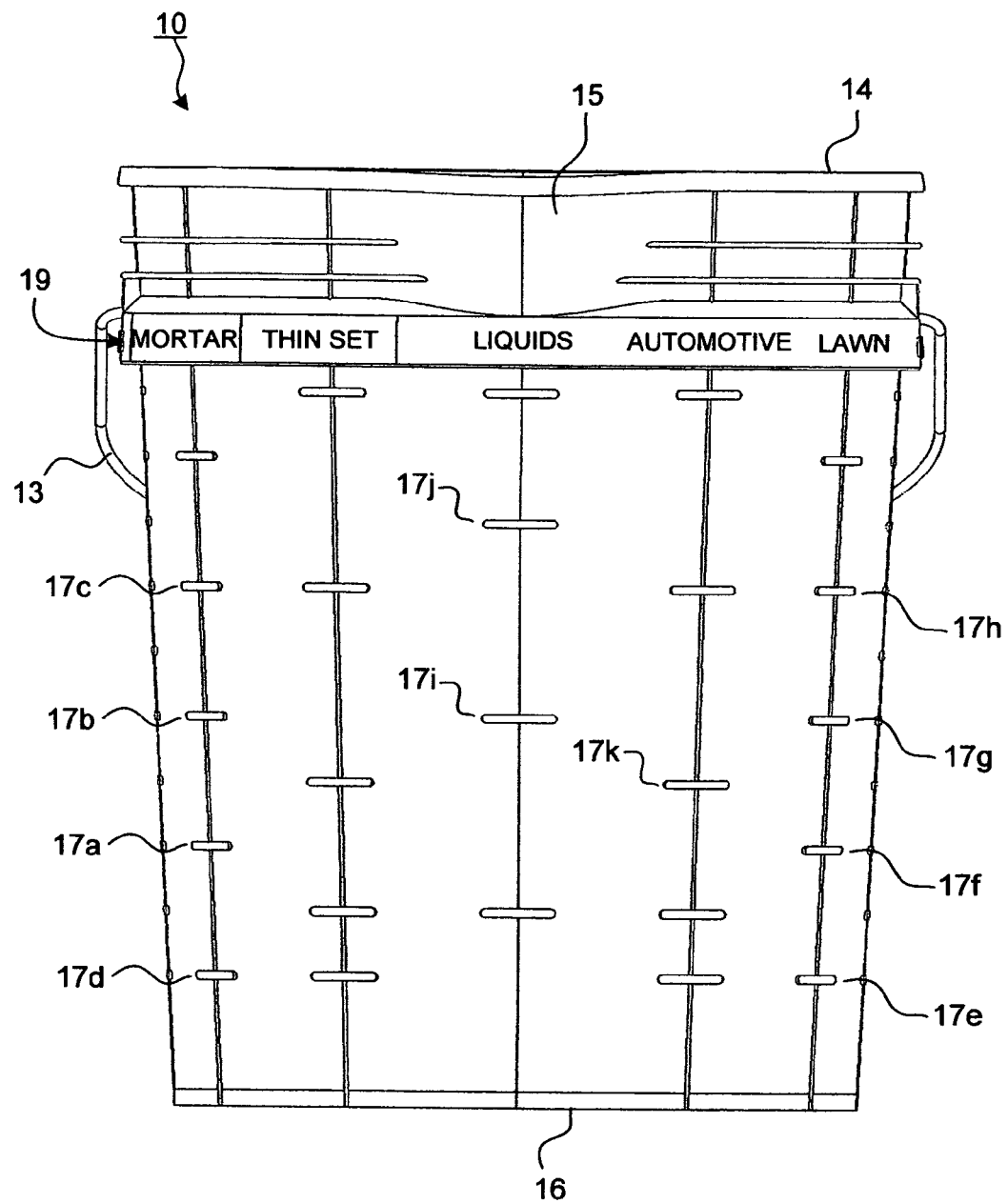
FIG. 6 is a front view of the measuring container illustrating the graduation marks in accordance with this subject disclosure.
Figure 7:
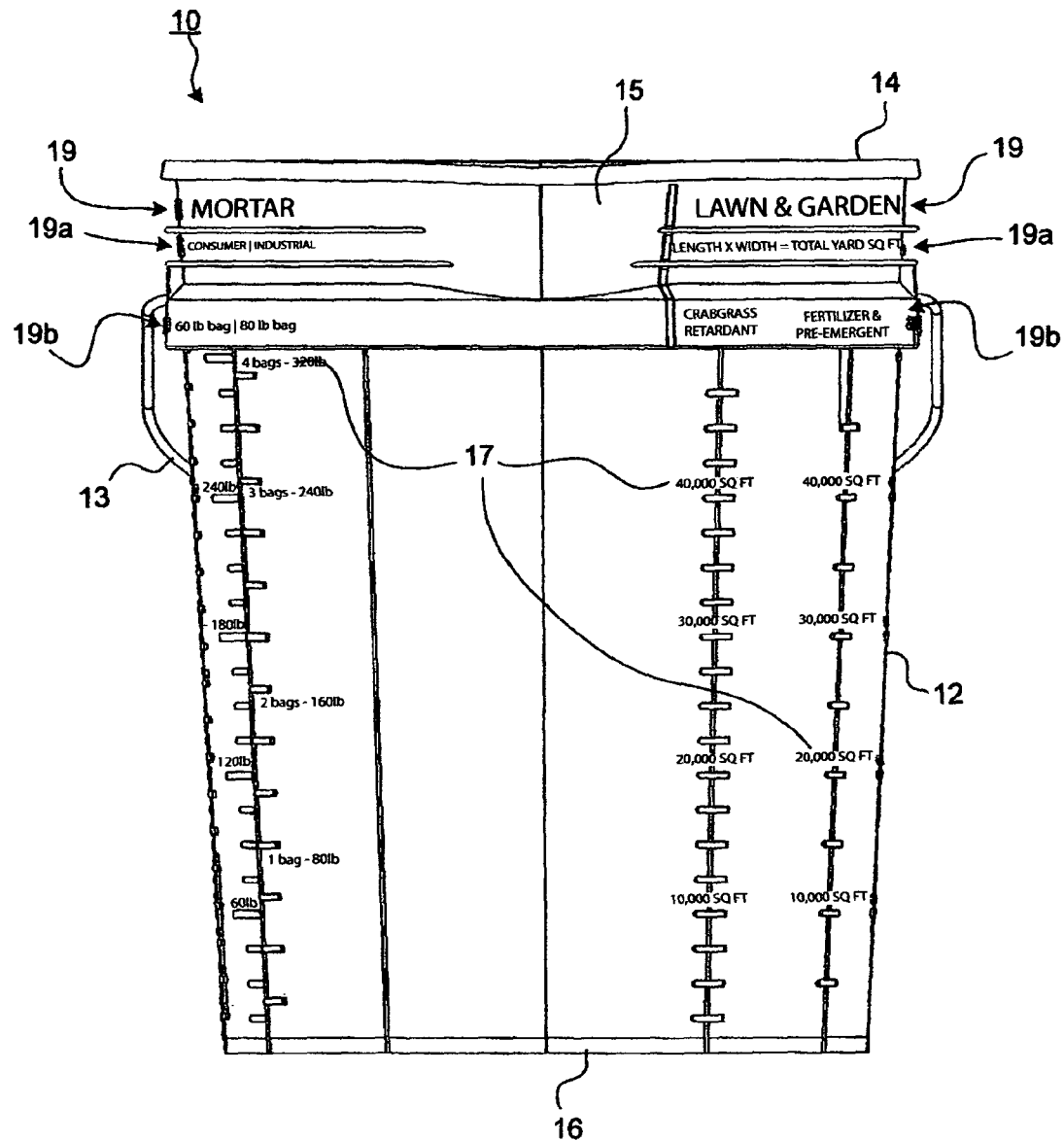
FIG. 7 is another exemplary front view of another measuring container illustrating the graduation marks in accordance with this subject disclosure.

FIGS. 6 and 7 are front views of the measuring container 10 that further illustrate various category labels 19, subcategories 19a, batch type and level 19b indicators, and the graduation marks 17 in accordance with this subject disclosure. As mentioned before, unlike with conventional measuring devices, the graduation marks 17 (17a-17k) under each of individual categories 19 on the measuring bucket 10 are adapted for use with commercially available prepackaged batch units in a simple and convenient manner that has never been proposed before this subject disclosure.

Referring to FIG. 6, in operation for example, the measuring container 10 may be adapted for use with mixing and preparing concrete. In use, the user would turn the measuring container 10 to the category labeled 19 MORTAR which correspond to indicator marks 17a-17d. The various graduation marks (17a-17k) on the vertical wall 12 of the measuring container 10 may be marked off according to the particular batched item size being used. For example, if the MORTAR being used is a fifty pound batched item sized bag, then the second graduation mark 17 may be labeled 17a to indicate the appropriate amount of water to be added to the measuring container 10 in order to obtain the desired proportion of water to a fifty pound batched item size bag of MORTAR for the desired mixture of concrete as specified by the manufacturer. Likewise, if a sixty pound batched item size bag of if the MORTAR is to be used, then the third graduation mark 17 may be labeled 17b to indicate the appropriate amount of water to be added to the measuring container 10 in order to obtain the desired proportion of water for a sixty pound batched item size bag of MORTAR as specified by the manufacturer. And, for an eighty pound batched item size bag of MORTAR, then the fourth graduation mark 17 may be labeled 17c to indicate the appropriate amount of water to be added to the measuring container 10 in order to obtain the desired proportion of water for a eighty pound batched item size bag of MORTAR as specified by the manufacturer.

If the user has a small job and only needs to use half of a fifty pound batched item size bag of MORTAR, then the first graduation mark 17 may be labeled 17d to indicate the appropriate proportion of water to be added to the measuring container 10 in order to obtain the half the desired proportion of water for a fifty pound batched item size bag of MORTAR as specified by the manufacturer. In this event, the user can save the remainder of the fifty pound batched item size bag of MORTAR for a later use.

As shown, unlike with conventional measuring devices which are not concerned with any particular type of material being used, the measuring container 10 of this subject disclosure duly defines its specific graduation marks 17 based on the particular batched item product being used, such as defined by the various category labels 19, subcategories 19a, batch and level 19b indicators in the MORTAR in the example above, and as shown in FIG. 7. In this way, the user need only concern himself with the volume of the prepackaged batched item and not the intricacies of cumbersome volumetric designations, such as ounces, cups, liters, gallons, and the like which are commonly detailed on the label of a prepackage batched raw material item. Using the prepackaged batched item measurement as the volume is much easier to use and invariably will result in a consistent proper proportion for each batch use after use.

The various graduated marks 17 are associated with the various category labels 19, subcategories 19a, and batch and level 19b indicators and may be marked to measure any number of consumer raw materials that are to be mixed. The measuring container 10 is formulated for use with various products of different consistency. The measuring container 10 provides a solution for mixing each of the various specific materials according to the prepackaged batch size of the size of the bag and/or product to a correct consistency as defined by the manufacturer in a simple and easy to use way. Used in this manner, the finished combined material may be mixed in, or outside of, the measuring container 10 in accordance with this subject disclosure. The measuring container 10 is used to formulate the appropriate proportion of a first component (e.g., a liquid, solid and/or the like) to pour into a second component (e.g., the raw material based on prepackaged batch size item) for a perfect mixed ratio every time, as marked in accordance with the consumer product batch size.

According to yet another aspect of this subject disclosure, the overall volumetric dimension of the volume to be treated by the raw material or mixture composition may be defined by the various graduation marks 17 on the side of the measuring container 10. Thus, not only is the consumer raw material purchased in industry standard prepackaged batched containers measured and provided for as graduation marks 17 on the measuring container 10, but the various overall area and overall volumetric dimensions to be treated by the various raw materials or mixtures, such as the complete surface area of a lawn, or the complete cubic volume of a swimming pool may also be provided by the graduation marks 17 on the measuring container 10.

Referring to the lawn example in FIGS. 1 and 7, an individual who desires to convey or broadcast a correct amount of crab grass retardant on a 75,000 square foot lawn may employ the measuring container 10 of this subject disclosure, and may refer to the category label 19 entitled LAWN to determine the appropriate portion of the CRAB GRASS RETARDANT (such as shown in FIG. 7) to be used on a lawn covering 75,000 square feet. In this way, the various graduation marks 17 on the measuring container 10 may be associated with the square footage of an area. That is, the first graduation mark 17e may relate to an area 50,000 square feet, the second graduation mark 17f may relate to an area 75,000 square feet, the third graduation mark 17g may relate to an area 100,000 square feet, and the fourth graduation mark 17h may relate to an area 150,000 square feet. Numerous possibilities may be adapted for use with the measuring container 10 in accordance with this subject disclosure. By way of example, FIG. 7 further discloses another exemplary embodiment of a more detailed rendition of the measuring container 10 in accordance with another configuration of this subject disclosure. Utilizing the measuring container 10, the user may consistently broadcast the correct amount of crab grass retardant for a particular size lawn, eliminating waste, time and potentially ruining the yard where otherwise too much crab grass retardant would cause irreparable damage to the grass. By employing the measuring container 10 in the manner as mentioned above the novice user may take the guess work out of determining proper, more consistent, proportions, and he may likewise apply the required composition like a professional every time.

Referring to the swimming pool example, the overall volume of the pool may be defined by various graduation marks 17 under the category label 19 named "POOL" or "LIQUIDS" (as shown in FIG. 6) for example. In this example, a swimming pool is to be treated by chlorine. Similar to the LAWN example shown and described with respect to FIG. 1, the user may look to the various graduation marks 17 (17i, 17j) under LIQUIDS. The actual size of the swimming pool may be defined on the vertical wall 12 of the measuring container 10. For example, a 50,000 gallon swimming pool may be assigned to the second graduation mark 17i on the measuring container 10. As such, the user may pour chlorine powder up to the 50,000 gallon graduation mark 17i to determine the exact amount of chlorine necessary for the 50,000 gallon pool. Various other examples may be used, such as, but not limited to, a coolant for an automobile radiator may also be calculated in this same way, as well as for various other materials.

In yet another example, an individual who purchased a twenty pound industry standard batched sized bag of a joint compound, and who only wants to mix a half bag of the twenty pound joint compound, may do so by referencing a category label 19 entitled "JOINT COMPOUND" as shown in FIG. 5 on the measuring container 10. The user may then refer to the appropriate graduated mark 17 (for example 1, 2 or 3 bag mark) on the vertical wall 12 of the measuring container 10 to determine an appropriate amount of the additive compound required for a desired mixture compound. The individual may then proceed to fill the measuring container 10 with water up to the 2 bag mark located within the JOINT COMPOUND graduated mark scale and fill appropriately. When poured into a different vessel containing the 2 bags of raw JOINT COMPOUND a perfectly mixed batch will result.

Another aspect of the subject disclosure is the ability to mix fractional portions of various batched products, such as half and quarter bags of a particular material. Accordingly, the measuring container 10 may be marked by various graduation marks 17 denoting a ¼, ½, and ¾ and a full bag of a particular standardized consumer raw materials, such as one that is purchased in a batched prepackaged unit. For example, concrete may be purchased in fifty, sixty and eighty pound bags. As such, the measuring container 10 may contain fractional graduation marks 17 for selectively calculating and measuring ¼, ½, and ¾ and full size bags to be mixed. Any size graduation mark may be accounted for, for any type or size of a bag of material composition, and not limited to, mortar, joint compound, grout, or a consumer might purchase. The novice user will be able to precisely formulate and duplicate the correct mixture of a first compound (e.g., water) to a second compound material by using the graduated scale marks 17 for the specific batched bag size of material is to be formulated.

As shown in FIG. 6, the measuring container 10 is also adapted for use to accurately measure small quantities of a liquid or solid. For example, when washing an automobile, the user may refer to the category label 19 entitled "AUTOMOBILE" and the graduation marks 17 that pertain thereto. If a liquid soap calls for two ounces of soap for every three gallons of water, the measuring container 10 may be filled to the third graduation mark labeled 17k indicating 3 gallons of water. In the traditional sense the two ounces of soap may be added directly into the measuring container 10 to prepare the perfect allotment of soap to water per the manufacturer's specifications for best results.

Figure 9:
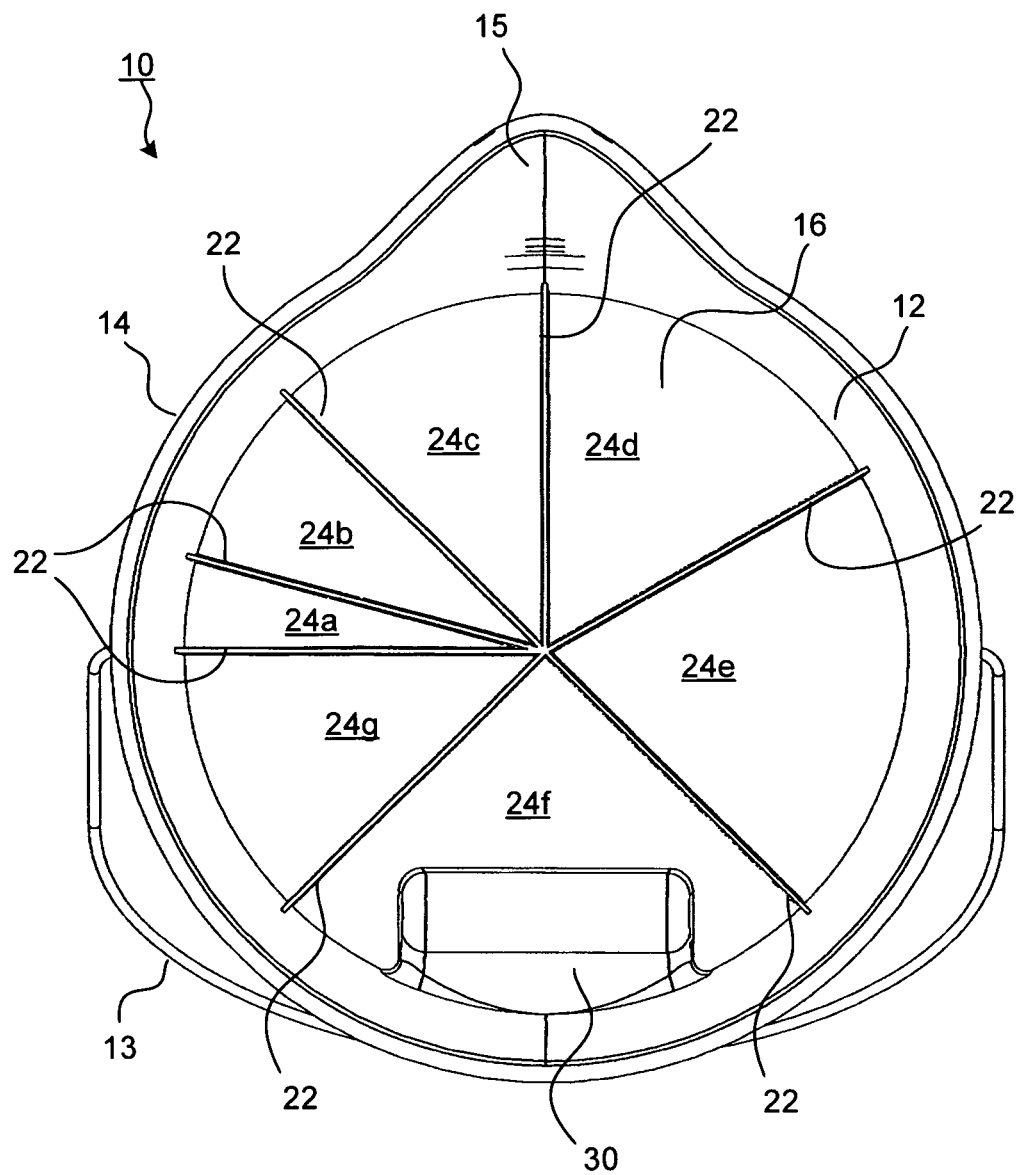
FIG. 9 is a top view of the measuring container showing various internal dividers in accordance with this subject disclosure.
Figure 10:
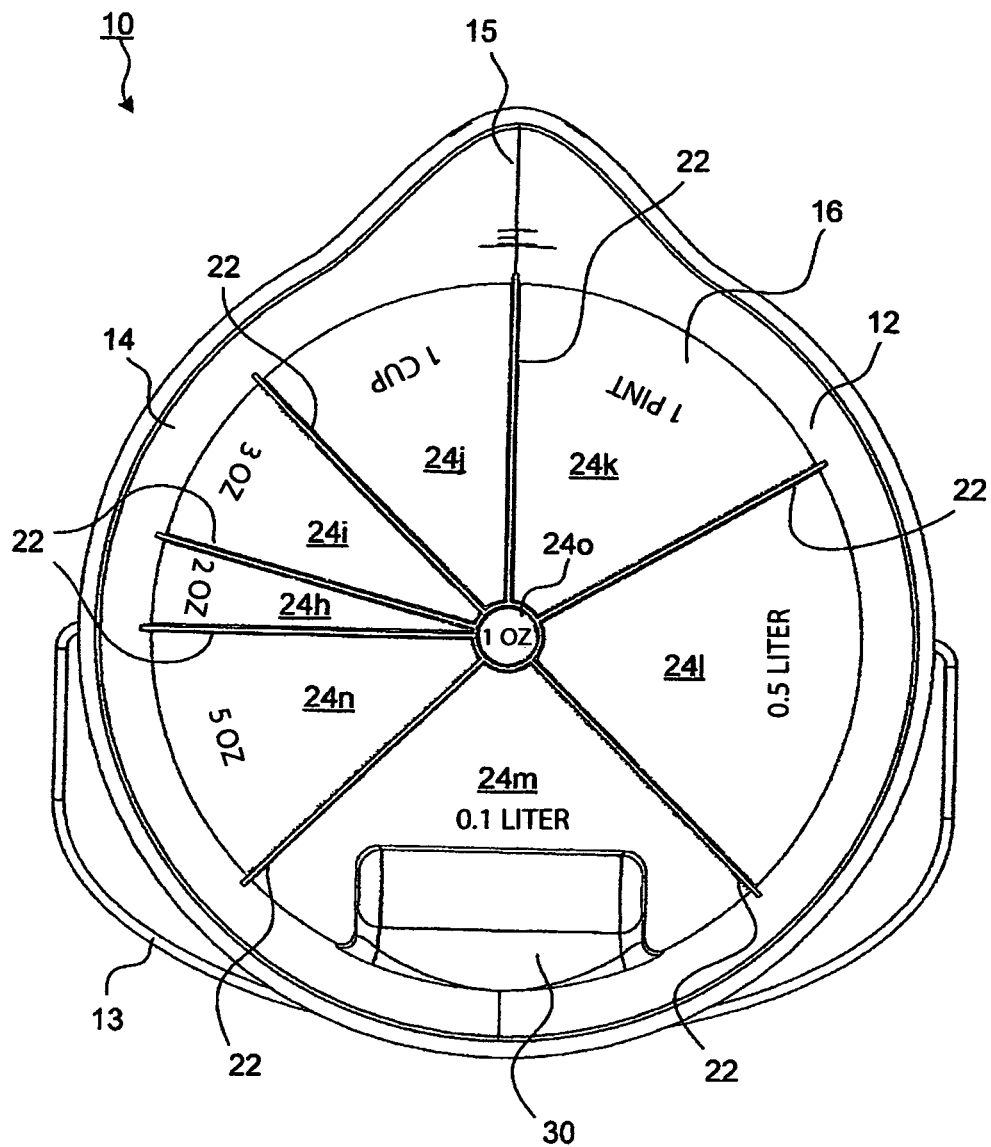
FIG. 10 is a top view of another measuring container showing various internal dividers in accordance with this subject disclosure.
Figure 11:
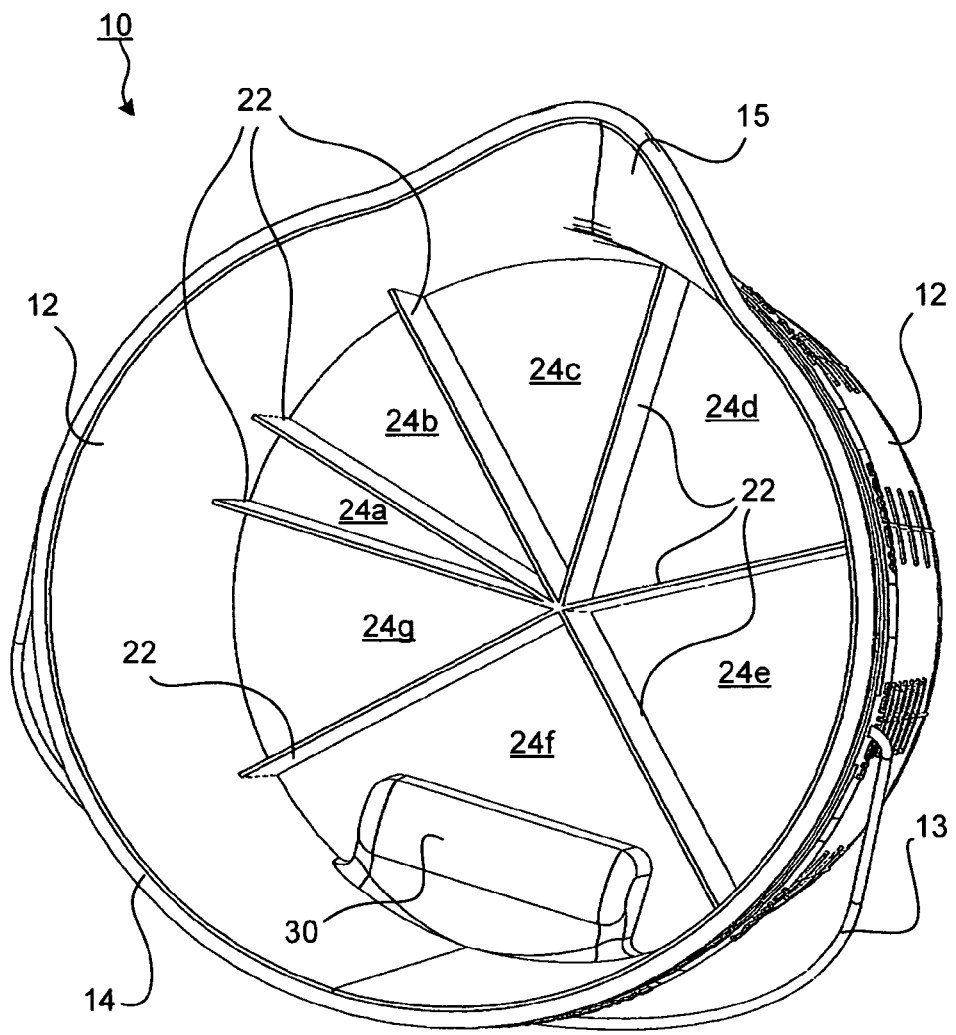
FIG. 11 is a perspective top view of the measuring container showing the various internal dividers and the recessed handle in accordance with this subject disclosure.
Figure 12:
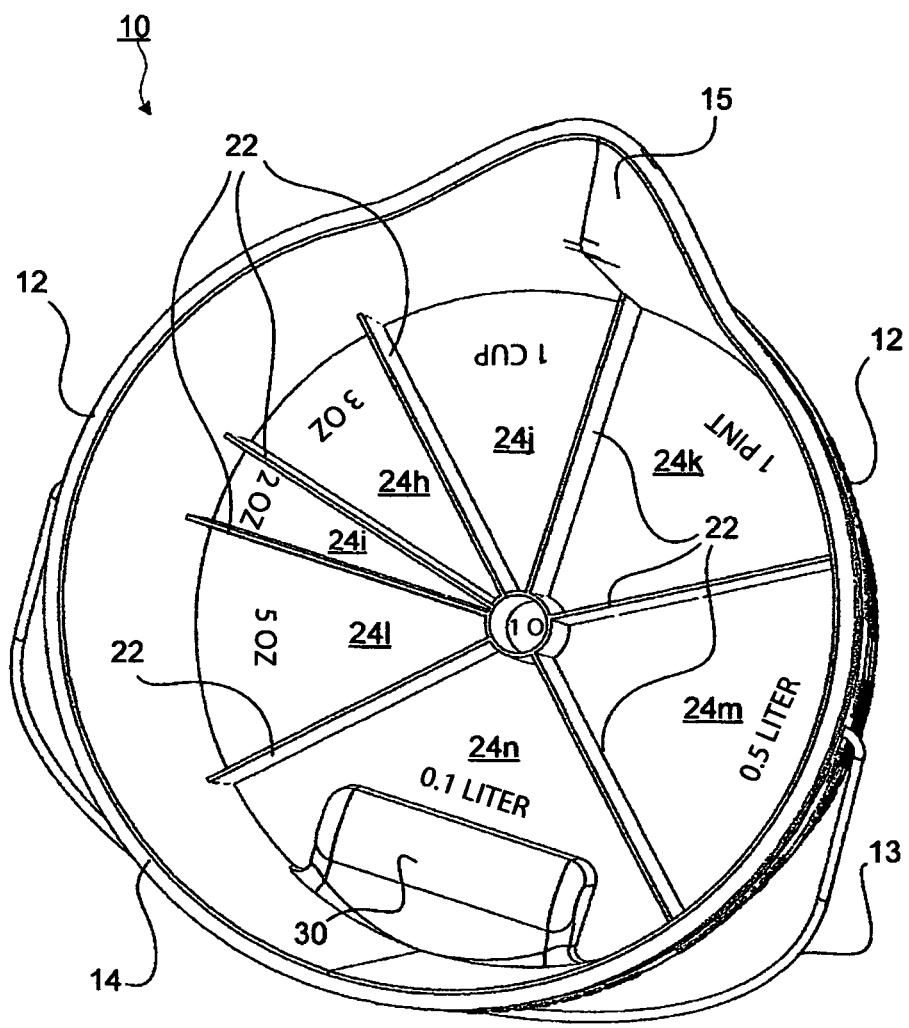
FIG. 12 is a perspective top view of another measuring container showing other exemplary configurations for internal dividers and the recessed handle in accordance with this subject disclosure.

FIGS. 9-12 illustrate various top and perspective views of the measuring container 10 showing various internal divider 22 configurations. FIGS. 11 and 12 depict perspective top views better illustrating a depth to the various internal dividers 22 in accordance with this subject disclosure. As shown in FIG. 9, the internal dividers 22 extend radially outward from a center 16a of the closed bottom end 16 of the measuring container 10 to the outside cylindrical vertical wall 12. Each of the internal dividers 22 is spaced radially at predetermined angular orientations relative to each other to define various volumetric sections 24a-24g. The various individual volumetric sections 24a-24g are adapted to define different volumes for various purposes.

Referring to FIG. 9, for example, the first volumetric section 24a may be constructed to hold ¼ cup of a liquid, the second volumetric section 24b may be constructed to hold ⅓ cup of a liquid, the third volumetric section 24c may be constructed to hold ½ cup of a liquid, the fourth volumetric section 24d may be constructed to hold ⅔ cup of a liquid, the fifth volumetric section 24e may be constructed to hold ¾ cup of a liquid, the sixth volumetric section 24f may be constructed to hold 1 cup of a liquid, and the seventh volumetric section 24g may be constructed to hold 1¼ cup of a liquid, or the like.

FIG. 10 shows another exemplary illustration where the internal dividers 22 extend radially outward from an inner defined center circular divider portion defining volumetric section 24o at the closed bottom end 16 of the measuring container 10 to the outside cylindrical vertical wall 12. Each of the internal dividers 22 are spaced radially at predetermined angular orientations relative to each other, extending from the central volumetric section 24o, outward to define various volumetric sections 24i-24n. The various individual volumetric sections 24i-24n define different volumes for various purposes.

The construction of the internal dividers 22 and the individual volumetric sections 24a-24o illustrated in FIGS. 9-12 are merely provided for demonstration purposes and may be constructed in a variety of different sizes and shapes other than radially extending pie-like configurations. The reference to these various volumetric measurements above is only intended to be exemplary and not intended to be limiting, as indicated above, the various volume measurements may be defined in terms of a batched size for a particular material composition. As such, the construction for the various individual volumetric sections 24a-24o may be made more, or less, and may take any number of different shapes and sizes. The depth of the internal dividers 22 may be constructed at any height, and the various internal dividers 22 for the individual volumetric sections 24a-24o may be different heights. Although shown as a plurality of radial dividers, the dividers subsections may take any uniform or non-uniform range of heights and widths and there in between. The smaller graduations may take the form of other shapes as it pertains to individual compounds. For example, circular and/or trapezoidal, or any shape in the bottom of the measuring container 10 may be employed to measure liquids, solids or the like.

Figure 13:
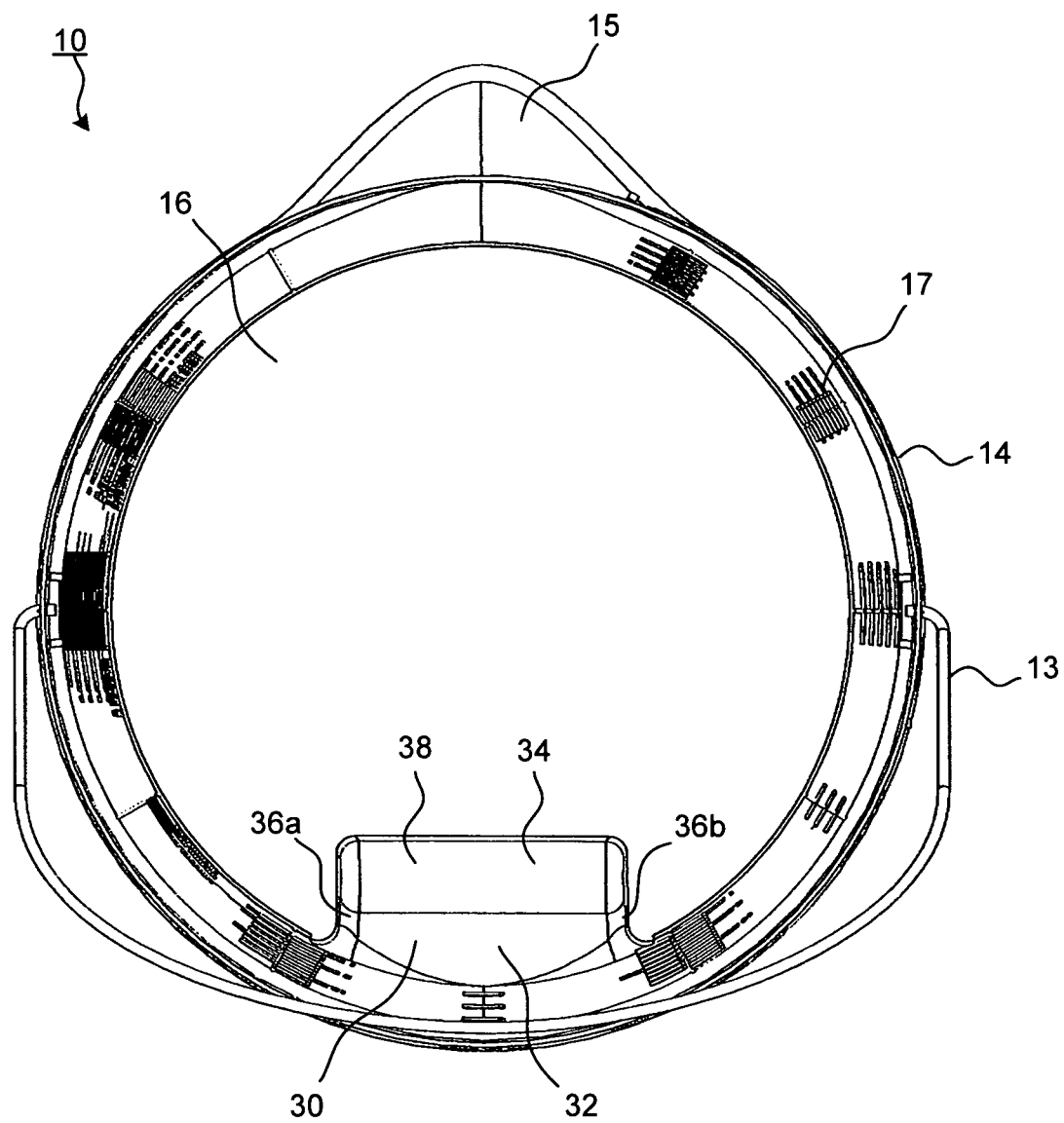
FIG. 13 is a bottom view of the measuring container showing the internal handle in accordance with this subject disclosure.

FIG. 13 shows the bottom 16 of the measuring container 10 may be constructed without the internal dividers 22 that are shown and described in FIGS. 6, 6A, 7 and 7A above. As such, the measuring container 10 may be used for a variety of other applications.

Although not shown, it is to be understood that the bottom closed end 16 of the measuring container 10 may be constructed to be removable from the measuring bucket 10. One advantage to the constructing a removable bottom closed end 16 is washing out the measuring container 10 is much easier when the bottom closed end 16 may be detached from the remainder of the measuring container 10. Cleaning the internal dividers 22 and the various volumetric sections 24a-24g is easy to perform with the bottom closed end 16 removed from the cylindrical vertical wall 12 of the measuring bucket 10.

Another object of this subject disclosure is to provide a sleeve or liner (not shown) for use with the measuring container 10. In use, the liner may be used to removably layer the inside of the measuring container 10 so that it may be removed once a particular raw material has been used and expended. The liner itself may be imprinted with the various category labels 19, subcategories 19a, and/or batch and level 19b indicators so that when the measuring container is viewed from the inside, the various category labels 19, subcategories 19a, and batch and level 19b indicators may be viewed and a raw material or other component may be filled to a predetermined level. Various alignment indicators, hashes, or the like may be integrated into the liner to align the various category labels 19, subcategories 19a, and batch and level 19b indicators with the same on the inside or outside of the measuring container.

The liner is useful for a variety of different uses, such as where paints or a thin set may be used in the measuring container 10 with the liner. The paint may be poured into the measuring container 10 up to a predetermined level based on the desired raw material of other desired component, paint, thin set or the like, and used there from. When the task has been completed, the liner may be removed and thrown away where it is constructed as a disposable piece. Likewise, the liner may be a reusable piece and may be removed from the measuring container 10, cleaned and reused at a later time. Amongst various advantages, the liner allows the user to very quickly mix various compounds or raw materials one after each other without having to worry about cleaning up the measuring container before measuring the next item. Clean up is simple and replacement of the liner is quick. The liner would serve to increase the efficiency of the user who has to mix more than one raw material. In other applications, the liner may be implemented for use when wanting to drain oil into the measuring container 10 or some other material that would not generally be easy to clean out of the measuring container 10.

In addition determining a predetermined prepackaged batch raw material to be used, or other mixing component, the liner may contain a plurality of different use applications. For example, the liner may be used to mix various paints together. The inner liner may include various graduation marks 17 to indicate the appropriate amount of paint to be added to create a desired color. In addition to placing the various mix proportions on the liner itself, the appropriate mix proportions may be placed on a label on the can and/or integrated with some portion of the can, such as on a lid.

It is also to be understood that various kinds of support for determining the appropriate proportions may be provided on-line, in literature, on the measuring container 10 itself, and accessible in a variety of different ways. The various types of information may be found at the support location, such as conversion tables for calculating the various quantities to be poured into the measuring container 10 for a specific task, such as gallons/square footage, PH, cubic, yards, bags of concrete or other raw material such as fertilizer, instructions for measuring container 10 usage and the like. The on-line support channel will enable a do-it-yourselfer to determine how much raw consumable product needs to be purchased in order to complete a specific do-it-yourself home project, or projects on a much larger scale.

Figure 8:
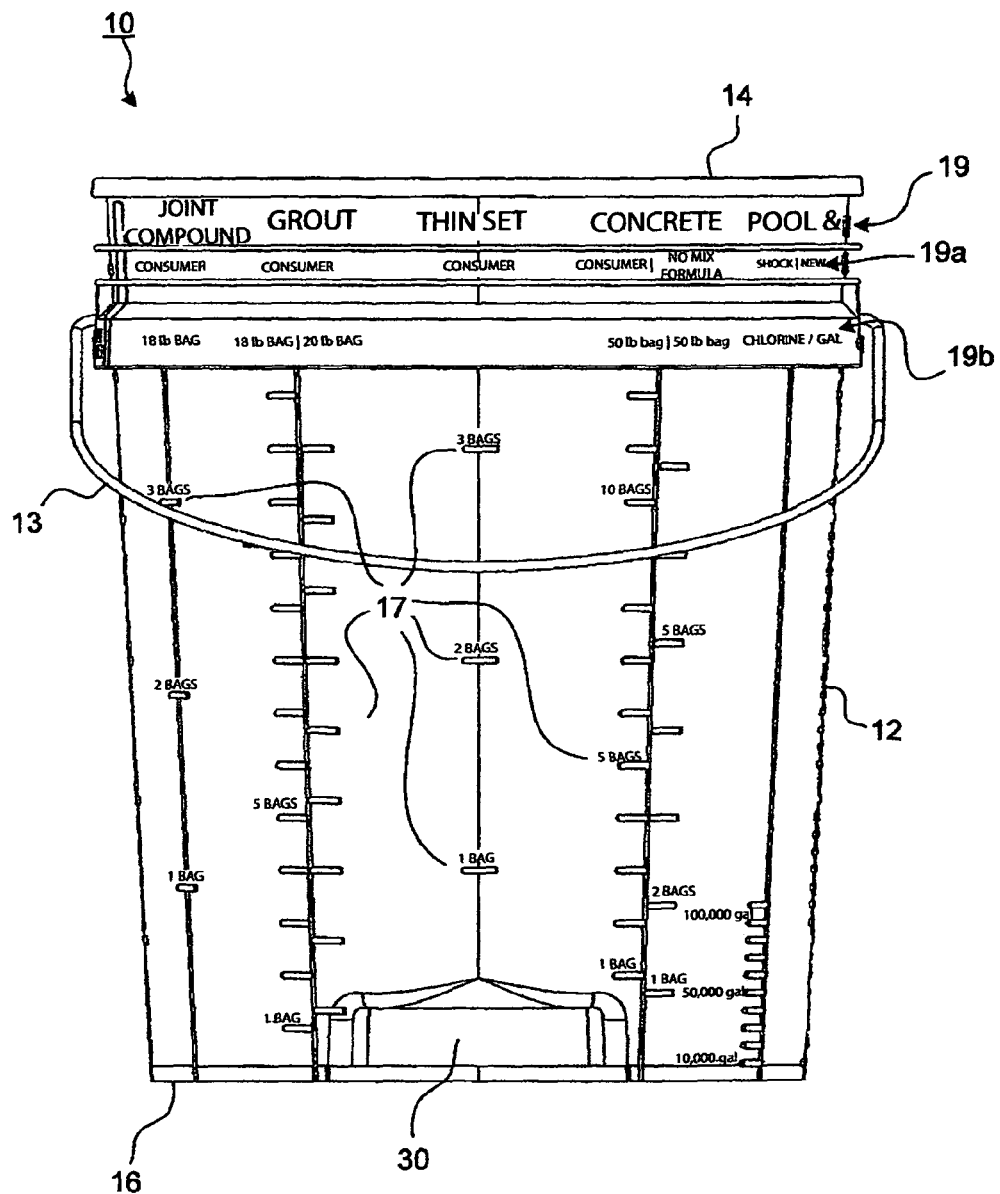
FIG. 8 is a rear view of the measuring container depicting the recessed handle in accordance with this subject disclosure.
Figure 14:
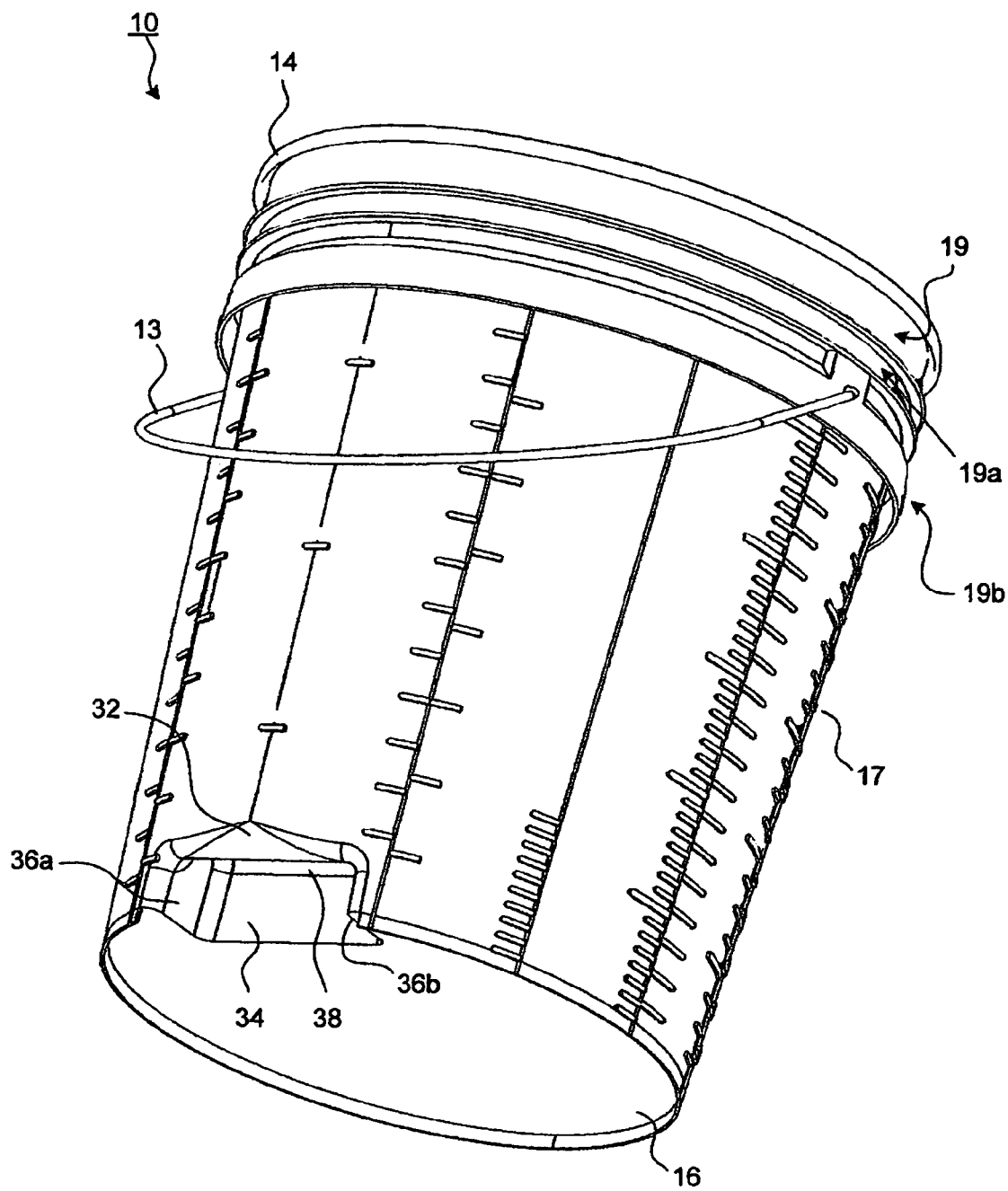
FIG. 14 is a perspective bottom view of the measuring container showing the recessed handle in accordance with this subject disclosure.

FIGS. 8 and 13-14 are rear views of the measuring container 10. They depict the bottom view of the measuring container 10 depicting the recessed handle 30. The recessed handle 30 is provided to enable the user to hold the measuring container 10 in a controlled manner while the various contents within the measuring container 10 are poured and mixed there out of in accordance with this subject disclosure. The recessed handle 30 is shown molded into the closed bottom end 16 of the measuring bucket 10. Although the recessed handle 30 is shown recessed within the lowed closed end 16 of the measuring container, it is to be understood that various types of handles may be constructed onto the measuring container 10. For example, the handle may be an extruded portion extending outside of the vertical wall 16 of the measuring container and/or any other suitable construction suitable for gripping and lifting the measuring container 10.

In more detail, FIG. 13 is a bottom view of the recessed handle 30, and FIG. 14 illustrates a perspective bottom view depicting the recessed handle 30 in the measuring container 10 in accordance with this subject disclosure. As shown, the recessed handle 30 includes a finger grip 32 portion capable of receiving various fingers of a user. The finger grip 32 portion is defined by a recessed finger slot 34 bounded by a pair of open recess channel walls 36a and 36b, and a top edge 38. The finger grip 32 portion extends backward from the top edge 38 of the recessed finger slot 34 a predetermined distance to enable the user to comfortably grasp the finger grip 32 portion.

As shown in the various FIGS. 4-7, the various exemplary category labels 19, subcategories 19a, and batch and level 19b indicators may be comprised of any number of different application categories. That is, the measuring container 10 may be used for a variety of different purposes, some of which, but not intended to be limited to, the various categories 19, and subcategories 19a. It is to be understood that the measuring container 10 may be used in accordance with a plurality of different types of categories, subcategories, and various types of batch and level indicators based on predetermined batch sizes for a variety of different types of raw materials, and overall end area or overall volumetric uses. However, it is to be noted that the measuring container 10 may also incorporate traditional measurement scales, such as for example: pints, quarts, gallons, square footage, as well as international scales, such as for example, liters and meters.

The measuring container 10 is uniquely adapted to accurately mix industry standard sized batch bags or containers having a first prepackaged end result quantity with a proper amount of either a raw material, or other component having either the same desired end quantity, or some other desired quantity not particular selected by the prepackaged batched item where there are no directions for obtaining partial or a proportion of the overall intended quantity. The measuring container 10 is adapted to allow the user to easily self formulate and in a predictable manner appropriate measurements for various components in a mixture for various manufactured pre-packaged batched material items. It is to be understood that a variety of different components may be provided and determined by the measuring container in accordance with this subject disclosure where more than one component may be necessary to create a complete mixture.

Various constructions may be used in accordance with this subject disclosure. It is to be understood that the measurement container 10 may be made as a single integral piece construction, or made be made of various modular components in construction. It is also to be understood that the measurement container 10 may be constructed as a product specific measurement container 10, such as a pond, a pool, a hot tub or Jacuzzi, and the like. Product specific gift packs packaged in separate cases that may be sold in conjunction with a specific product, e.g., package of PH strips/5 oz. muratic acid, Algae inhibitor, for pools, ponds, hot tubs and/or other product specific measuring container.

It is well know that there is no product currently designed to universally measure product specific. The ability to measure small amounts and large amounts of various components in conjunction, or concurrently, with each other within a single measuring container 10 is unique. Conventionally, an individual would have to employ a variety of different devices and/or measuring containers to mix smaller materials into larger matches or compound mixtures.

The ease with which the measuring container 10 includes product specific graduations makes the task for the user easier to formulate appropriate proportions of a mixture without instruction. In other words, the measuring container 10 is the instructions, and easy to understand as it is based on the product category and industry standard container purchased in. Another aspect of the device is employing the use of the measuring container 10, the user can formulate ¼, ½ and ¾ bags of a prepackaged batch size of a raw material accurately. Traditionally, the manufacturer of the raw material generally provides instruction for the use of the entire batched product item. There was little incentive for the manufacturer to teach the consumer how to use only portions of the bag, that way the manufacturer of the raw material could sell more bags. Unfortunately, the user would all too often have too much waste at the end of their project. The conventional solution was that the novice user would painstakingly try and calculate proportions for use, instead of having to use the entire batch. An object of this subject disclosure is using the measuring container 10, is to allow the user to determine how to use a portion of the batched product and to save the remainder for later use without having to perform cumbersome computations to come up with an desired proportional amount. Employing the measuring container 10, it is not possible to use smaller than manufactured prescribed measurements, such as by measuring ¼, ½, and ¾ bags accurately. The advantage being that the user can reduce the amount of waste and save the leftover unmixed compound for later use, saving him time and expense in the long run.

Various materials may be used for the various components in accordance with this subject disclosure, including, but not limited to metal, a polymer, and or any other suitable material.

It will be recognized by those skilled in the art that changes or modifications may be made to the above described embodiments without departing from the broad inventive concepts of the subject disclosure. It is understood therefore that the subject disclosure is not limited to the particular embodiments which are described, but is intended to cover all modifications and changes within the scope and spirit of the subject disclosure.

What is claimed is:

1. A measuring container to determine an appropriate proportion of at least one composition for a complete mixture defined by a prepackaged batched material size product comprising:
   a cylindrical vertical wall defining a container cavity with an upwardly open upper end and an enclosed bottom end; and
   various indicia including at least two material mixture categories and associated graduated marks for measuring a level relating to a raw material being at least one component of at least one material mixture and based on a batched container size of the raw material.

2. The measuring container recited in claim 1, wherein the measuring container further comprises a pour spout disposed at the upwardly open upper end of the measuring container for pouring the at least one component of the at least one material mixture from the measuring container.

3. The measuring container recited in claim 2, wherein the measuring container further comprises a handle provided to lift the measuring container and attached adjacent to the open upper end of the measuring container.

4. The measuring container recited in claim 2, wherein the measuring container further comprises a recessed handle portion disposed at the enclosed bottom end opposite a location of the pour the at least one component of the at least one material mixture from the pour spout of the measuring container.

5. The measuring container recited in claim 4, wherein the recessed handle further a finger grip portion capable of receiving various fingers of a user, the finger grip portion being defined by a recessed finger slot bounded by a pair of open recess channel walls, and a top edge, wherein the finger grip portion extends backward from the top edge of the recessed finger slot a predetermined distance to enable the user to comfortably grasp the finger grip portion.

6. The measuring container recited in claim 1, wherein the measuring container 10 further comprises at least one internal divider disposed inside of the measuring container and on the enclosed bottom end of the measuring container.

7. The measuring container recited in claim 1, wherein the measuring container further comprises a plurality of internal divider disposed inside of the measuring container and on the enclosed bottom end of the measuring container, wherein the internal dividers extend radially outward from a center of the enclosed bottom end of the measuring container to an outside cylindrical vertical wall, each of the internal dividers being spaced radially at predetermined angular orientations relative to each other to define various volumetric sections.

8. The measuring container recited in claim 7, wherein plurality of internal dividers having wall heights of different sizes that further define the various volumetric sections.

9. A measuring container to determine an appropriate proportion of at least one component for a complete mixture defined by a prepackaged batched material size product comprising:
 a cylindrical vertical wall defining a container cavity with an upwardly open upper end and an enclosed bottom end; and
 a pour spout disposed at the upwardly open upper end of the measuring container for pouring the at least one component of the at least one material mixture from the measuring container;
 a handle provided to lift the measuring container;
 a recessed handle portion disposed on the enclosed bottom end, opposite a location of the pour spout, wherein the at least one component of the at least one material mixture may be controllably delivered from the pour spout of the measuring container; and
 various indicia including:
  a plurality of material mixture categories; and
  associated graduated marks for measuring a level relating to a raw material being at least one component of at least one of the plurality of material mixture categories, and based on a batched container size of the raw material selected from at least one the plurality of material mixture categories.

10. The measuring container recited in claim 9, wherein the measuring container further comprises at least one internal divider disposed inside of the measuring container and on the enclosed bottom end of the measuring container.

11. The measuring container recited in claim 9, wherein the measuring container 10 further comprises a plurality of internal divider disposed inside of the measuring container and on the enclosed bottom end of the measuring container, wherein the internal dividers extend radially outward from a center of the enclosed bottom end of the measuring container to an outside cylindrical vertical wall, each of the internal dividers being spaced radially at predetermined angular orientations relative to each other to define various volumetric sections.

12. The measuring container recited in claim 11, wherein plurality of internal dividers having wall heights of different sizes that further define the various volumetric sections.

13. A method to determine an appropriate proportion of at least one component to be disposed within a measuring container for a complete mixture, comprising:
 providing a measuring container having various indicia defining a plurality of material mixture categories based on a commercially prepackaged batched container size of a raw material;
 providing graduated marks on the measuring container identifying various predetermined level measurements for the at least one component to be combined with a predetermined amount of the commercially prepackaged batched container size of the raw material; and
 filling the at least one component into the measuring container up to the at least one predetermined level measurement based on the commercially prepackaged batched container size of the raw material selected from at least one the plurality of material mixture categories.

14. The method recited in claim 13, further comprising:
 conveying the at least one component from the measurement container and combining with the predetermined amount of the commercially prepackaged batched container size of the raw material.

15. The method recited in claim 13, further comprising:
 providing a measuring container having various indicia defining a plurality of material mixture categories based on a commercially prepackaged batched container size of a raw material;
 providing graduated marks on the measuring container identifying various predetermined level measurements associated with the at least one component to be combined with a predetermined amount of the commercially prepackaged batched container size of the raw material based on an end use measurement comprised of at least one of: an overall area to be conveyed or a volume.

\* \* \* \* \*